United States Patent [19]

Christensen et al.

[11] Patent Number: 5,233,487
[45] Date of Patent: Aug. 3, 1993

[54] FUNCTIONAL MEASUREMENT OF DATA HEAD MISREGISTRATION

[75] Inventors: Thomas C. Christensen, Rochester, Minn.; Matthew W. Rooke, San Jose, Calif.; Michael L. Workman, Rochester, Minn.

[73] Assignee: International Business Machines Corporation, Armonk, N.Y.

[21] Appl. No.: 722,444

[22] Filed: Jun. 27, 1991

[51] Int. Cl.$^5$ ............................................. G11B 21/08
[52] U.S. Cl. ............................ 360/77.04; 360/77.03; 360/77.05
[58] Field of Search ................ 360/77.04, 77.03, 77.05

[56] References Cited

U.S. PATENT DOCUMENTS

| | | | |
|---|---|---|---|
| 4,135,217 | 1/1979 | Jacques et al. | 360/77 |
| 4,136,365 | 1/1979 | Click et al. | 360/77.04 |
| 4,149,199 | 4/1979 | Click et al. | 360/77.04 |
| 4,524,397 | 6/1985 | Chalmers et al. | 360/77 |
| 4,562,494 | 12/1985 | Bond | 360/75 |
| 4,620,244 | 10/1986 | Krause | 360/77 |
| 4,697,213 | 9/1987 | Kitamura | 360/77.04 |
| 4,706,250 | 11/1987 | Patel | 371/39 |
| 4,816,938 | 3/1989 | Cowen et al. | 360/75 |

OTHER PUBLICATIONS

Paska, T. M., "Multitracks Per Inch Actuator/Accessing Arrangement", IBM Technical Disclosure Bulletin, vol. 20, No. 5, Oct. 1977; pp. 1893-1896.
Paton, A., "Correction of Data Track Misregistration in Servo Controlled Disk Files", IBM Technical Disclosure Bulletin, vol. 17, No. 6, Nov. 1974; pp. 1781-1783.

Primary Examiner—William L. Sikes
Assistant Examiner—Scott A. Ouellette
Attorney, Agent, or Firm—Blaney Harper

[57] ABSTRACT

The present invention demonstrates a rotating media storage system which quickly measures and accurately compensates for thermal and mechanical errors in the position of the data detector with respect to the written data. This is accomplished by measuring the error rate of the written data as a function of the read offset of the detector. Error rates become increasingly large as the sensed noise to signal ratio becomes large. The present invention counts the number of errors detected in reading written data for various read offsets when the data storage system is initially activated. When the number of errors reaches a target rate, the read offset required to produce the target rate is saved. This procedure is performed on either side of the data track. The detector is then centered between the two offsets. During the operation of the storage system, thermal and mechanical errors are introduced into the detector position compensation means. The present invention compensates for this by periodically determining a new offset for each side of the data track. The new offset which corresponds to the target error rate is found by interpolating between measured offsets for error rates which are higher and lower respectively than the target error rate. The new measured read offsets are obtained by reading back written data in a similar manner as was used to obtain the initial read offsets. The detector is then re-centered with respect to the write transducer position between the new offsets on either side of the data track.

25 Claims, 6 Drawing Sheets

FUNCTIONAL MEASUREMENT OF DATA HEAD MISREGISTRATION

FIELD OF THE INVENTION

This invention relates generally to the field of data storage and retrieval. More specifically, the invention relates to rotating media memory apparatus and to methods of determining position compensation to optimize detector read performance.

BACKGROUND OF THE INVENTION

Magnetic data storage media is useful in the storage of large amounts of data for computer systems. The data or information is stored as a series of magnetic field transitions oriented on a magnetic recording surface. The transitions are placed on the surface by a magnetic transducer commonly referred to as a head. The transducer converts electrical energy into a magnetic field, the polarity of which is switched according to the information to be recorded. The magnetic field causes magnetization to remain in the media after the field is removed. The information is stored as binary information in the polarity reversals, or transitions, remaining in the media. The transducer used with magnetic media may also act as a detector to detect data stored as magnetic transitions. The transducer senses a magnetic field emanating from the magnetized media. The sensed magnetic field is converted into an electric signal which is different depending on the polarity of the magnetic field. Information is then decoded from the electric signals. When the transducer places information on the recording media, the transducer is said to have written data to the storage media. When the transducer detects previously written data on the media, the transducer is said to have read the storage data. In general, systems for storing and retrieving information from magnetic media may employ a single transducer to both read and record data on the media, or they may employ dual transducers, one to read and one to write.

The recording media is flat (typically information is recorded on both an upper and lower surface of the media), circular, and thick enough to attenuate position deformations caused by external forces such as clamping. The center hole in the media is typically called a hub. The hub is where the recording media attaches to a motor, through an axis, which provides power to rotate the recording media. A transducer or head is flown on either side of the rotating surface of the recording media. The head is flown because when the recording media rotates, it creates air movement under the head which physically lifts the head off the surface of the recording media. The head remains close enough to the surface so that the magnetic field generated by the write transducer establishes magnetic transitions on the recording media surface or close enough so that a magnetic field in the media is sensed by the transducer. The transducer or detector is placed near the surface of the recording media by a mechanical means such as an arm or lever. The arm or lever moves the write transducer or detector radially (with respect to the circular media) in and out from the hub to the edge (also called rim) of the recording media as the recording media rotates about the hub. The write transducer writes data onto the recording media in tracks concentric with the hub of the recording media as a result of the radial motion of the transducer and the rotation of the recording media. A track is an area which forms a concentric band, having a width which is generally larger than the width of the write transducer, about the hub of the recording media.

Data is read from the recording media using the same motion of the detector with respect to the recording media as when the data is written. However, in order to read previously written data, the read transducer, or detector, must be positioned over the tracks on the recording surface where the writing transducer was to have written the data. This is important because the detector cannot sense the distance to the optimum data reading position from any one position. Positioning the detector over the recording area generally involves a rough positioning means and a fine positioning means. The rough positioning means places the detector over the tracks. Tracks have a width which is greater than the area on which the data is written. The fine positioning means is typically separate from the rough positioning means and operates to place the detector over the width of the track in which data is written, rather than simply over any part of the track.

Fine positioning means are especially useful in dedicated servo drive systems and sector servo drive systems having dual transducers for reading and writing. Sector servo drive systems have a fine positioning means which consists of writing predefined patterns of signals into reserved areas of tracks on the recording media and then reading back that same predefined pattern of signals. The objective is that by comparing the sensed signals to the predefined pattern of signals, the detector position with respect to the written track position can be modified to produce the most accurate reading of the data. Signals are used instead of data because some relationship between what is detected and the detector position must be established in order to adjust that relationship. Signals having varying characteristics such as frequency or amplitude with respect to position on the track can provide that relationship.

When the detector is the same as the write transducer (called a single element head) in the sector servo drive system, there is static misalignment of the one transducer with respect to the data due to mechanical movement. The position of the head is affected by temperature, tower tilt, and other factors which change with the movement of the recording media. However, when data is written onto the media and subsequently read from the media by radially moving the transducer to the same position as it was when the transducer wrote the data, the servo system ensures that the detector will correctly read the data. This is because, even if there is a difference in where the detector should be and where it is when data is written due to errors in the mechanical arm means which moves the transducer, that same error will exist when the detector attempts to read.

In contrast, when the drive system (whether sector servo, dedicated servo, or other type) has one transducer which writes data and one which reads data (detector) on the same mechanical arm, this system is called a dual element head system. A dual element head system has manufacturing tolerances in the alignment of the write transducer to the detector which significantly effect the ability of the detector to accurately read the data. This is because, when the mechanical arm means moves the detector and places it in the same radial position used when the write transducer wrote the data, the static misalignment is large enough to allow the detector to have difficulty sensing the magnetic field transition. As a result, even though the sector servo drive system moves the detector to the same radial position as was used when the data was written, the drive system may still not sense data correctly. Therefore, some fine position compensation to the detector position with respect to the write transducer position must be made when the mechanical arm is returning the detector to the position of the previously written data.

Fine positioning means are also useful in dedicated servo drive systems. A dedicated servo system is one in which there are at least two sets of recording media, transducers, and detectors. The first recording media has a permanent pattern of data written on it which can be read by a tracking detector dedicated to that recording media. The tracking transducer is mechanically linked to the write transducer and detector dedicated to the second recording media. This linkage is intended to maintain a stable relative position between the tracking detector and the the transducer and detector of the second recording media. Therefore, data written to the second recording media can be located by knowing the position of the tracking detector when the data was written. This position is indicated by the pre-recorded data already on the first recording media.

The problem with dedicated servo systems is that, in addition to the static misalignment of two different transducers on the same arm, mechanical and thermal effects from the operation of the disk drive introduce error into the position relationship between the tracking detector and the second recording media detector. Dedicated servo systems have one coarse positioning arm in addition to the data arm. Therefore, any significant errors of the data head radial position in one arm with respect to the coarse dedicated servo arm will result in the data detector potentially missing data it should sense. Recording media in storage systems typically rotate at approximately 3600 rotations per minute although this speed can be much faster or slower. The fast motion causes thermal problems because the temperature of the media varies as a function of the radial position on the disk due to the speed of the rotating surface which varies as a function of radial position. Thermal gradients due to temperature changes and temperature shifts can cause mechanical movement of actuator arms, tilting of actuators, and general misalignment of other mechanical parts. This movement causes errors in the head position. These errors are slowly time varying over the operation of the drive system and are large enough relative to the track width to cause position errors for reading of the previously written data. The movements manifest themselves as increasing the error rate of the drive system in reading data over the time the drive system is in operation.

Optical storage media is similar in function to the magnetic media. Data detectors must be placed adjacent the rotating storage media with such precision that the read error rate is sufficiently low. Optical storage media differs in that the optical sensors detect different physical phenomena than magnetic sensors. Specifically, the elements for writing optical data produce the presence or absence of light, rather than magnetic field transitions, which the detectors must sense. However, the detectors still have a mechanical means for being placed adjacent to the data. The mechanical means is still subject to thermal and mechanical error as in the magnetic media systems for the above cited reasons. Additionally, the mechanisms for keeping track of the position of the optical detectors, such as dedicated and sector servo drives, are similar to magnetic media. Therefore, the solutions to the problems encountered by magnetic media in correcting for detector position error are generally applicable to optical media as well.

The prior art has used several techniques for developing a fine positioning means to correct for the relative position error of the data detector or transducer with respect to the data tracks. A first technique was to define a thermal test area or track outside of the data recording area. A reference signal, which provides different frequency signals depending on the radial position of the transducer, is written to each half of the test track. The data detector periodically returns to the test track to read the reference signal. The fine positioning means compensates the position of the transducer until the frequency of the reference signal sensed by the transducer is the same as that previously sensed. The problem with this type of technique is that it requires circuitry not already in the drive system, in the form of a frequency discriminator, to compensate for the transducer position. Extra circuitry is expensive and consumes critical space in compact drives. Additionally, the servo compensation is limited in accuracy to the linear function of the frequency of the reference signal across the track. Given the dimensional sizes of tracks and errors, this linear function is not sensitive enough in many cases.

A second method used by the prior art to compensate for the position error of the detector is to reserve sections of individual data tracks for writing special patterns. In particular, the special patterns would return analog signals having a particular amplitude depending on the position of the transducer with respect to a reference point. The reference point would be the center of the written track, and the signals would be written onto each of the opposing halves of a written track. When the read transducer passes over these signals, the position of the read transducer will be compensated until the amplitude received from the signals on each half of the track is equal. The difficulty with this technique is that, as above, extra circuitry in the form of analog detection circuitry is required. Additionally, the space on the recording media that is reserved for the special signals takes away from the available space for data storage.

OBJECTS OF THE INVENTION

It is an object of the present invention to accurately read data in a rotating media storage system.

It is another object of the present invention to accurately position the data detector adjacent the written data in a rotating media storage system.

It is a further object of the present invention to quickly measure and accurately position the data detector adjacent the written data in a rotating media storage system.

It is still another object of the present invention to quickly measure and accurately compensate for position errors of the data detector with respect to the written data introduced during the operation of the rotating media storage system.

It is still a further object of the present invention to quickly measure and accurately compensate for position errors of the data detector with respect to the written data introduced during the manufacture of the rotating media storage system.

It is still another object of the present invention to quickly measure and accurately compensate for position errors of the data detector with respect to written data in rotating media storage without dedicating storage space to the correction mechanism.

It is still a further object of the present invention to quickly measure and accurately compensate for position errors of the data detector with respect to written data in rotating media storage without adding signal detection circuitry to the existing data detection circuitry.

It is still another object of the present invention to quickly measure and accurately compensate for position errors of the data detector with respect to written data in rotating media storage with high resolution in detector position compensation.

It is still a further object of the present invention to quickly measure and accurately compensate for position errors of the data detector with respect to written data in rotating media storage having magnetic or optical storage media.

It is still another object of the present invention to quickly measure and accurately compensate for position errors of the data detector with respect to written data in rotating media storage having single or dual element heads.

It is still a further object of the present invention to quickly measure and accurately compensate for position errors of the data detector with respect to written data in rotating media storage having dedicated servo or sector servo type drive systems.

SUMMARY OF THE INVENTION

The present invention demonstrates a rotating media storage system which quickly measures and accurately compensates for thermal and mechanical errors in the position of the data detector with respect to the written data. This is accomplished by measuring the error rate of the written data as a function of the read offset of the detector. Error rates become increasingly large as the sensed noise to signal ratio becomes large. The present invention counts the number of errors detected in reading written data for various read offsets when the data storage system is initially activated. When the number of errors reaches a target rate, the read offset required to produce the target rate is saved. This procedure is performed on either side of the data track. The detector is then positioned between the two offsets. During the operation of the storage system, thermal and mechanical errors are introduced into the detector position compensation means. The present invention compensates for this by periodically determining a new offset for each side of the data track. The new offset which corresponds to the target error rate is found by interpolating between measured offsets for error rates which are higher and lower respectively than the target error rate. The new measured read offsets are obtained by reading back written data in a similar manner as was used to obtain the initial read offsets. The detector is then repositioned with respect to the written track position between the new offsets on either side of the data track.

PREFERRED EMBODIMENT

Figure 1:
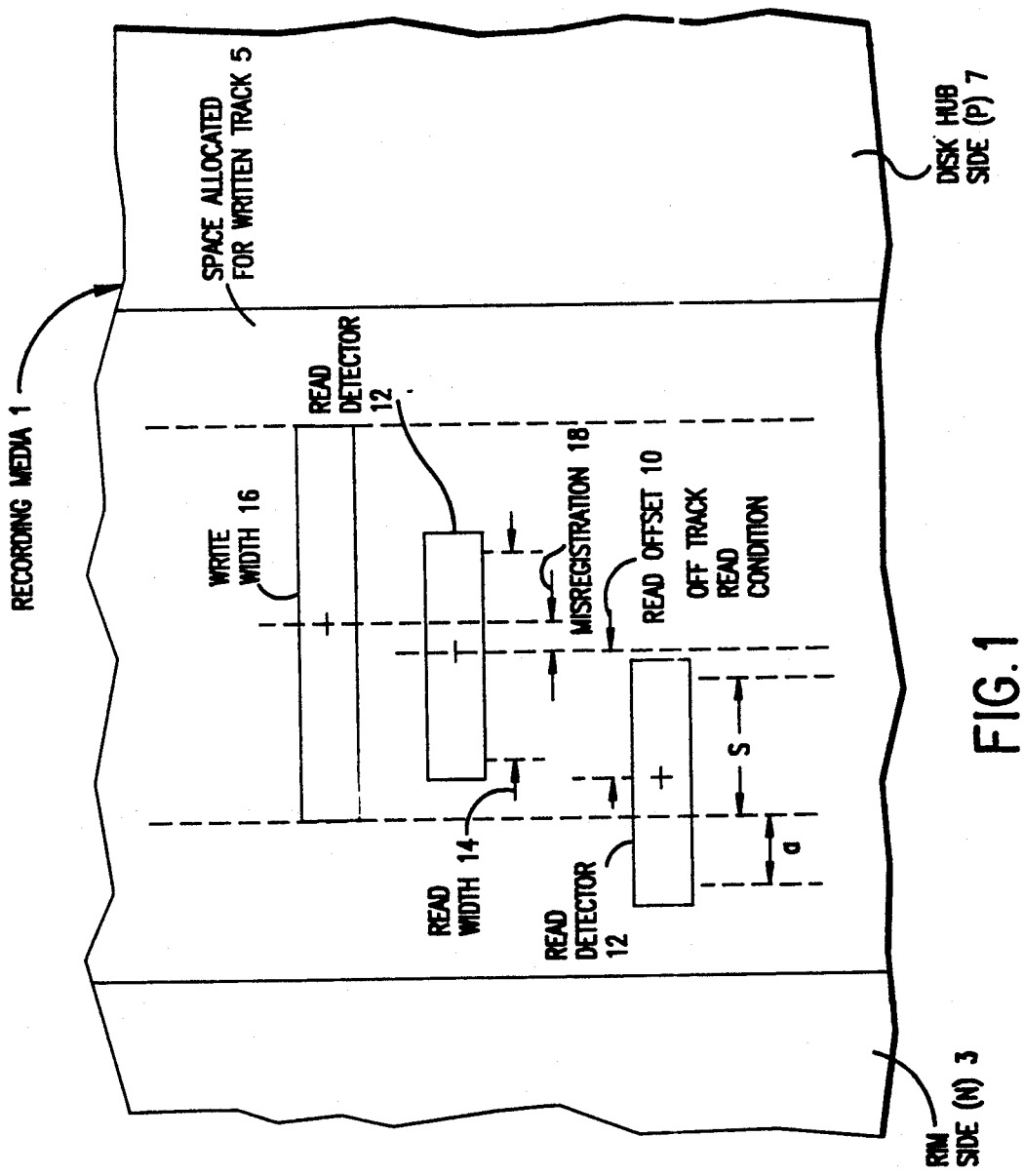
FIG. 1 illustrates the interrelation of various physical regions on a recording media of the present invention.

In order to compensate for the transducer position error in rotating media storage systems, the fine positioning means must readjust the position of the read detector with respect to the written track. FIG. 1 illustrates the relative components of the data track as a function of the radial distance across a written data track 5. In general, the fine positioning means determines the distance from the center of the track that the detector (also called read transducer or read head) is offset when reading data. This is called the read offset 10. In magnetic media systems, the magnitude of the useful read offset 10 is limited by the width of the magnetic field sensitive portion of the read detector 12. The useful magnetic field sensitive portion of the read detector 12 is called the read width 14. Similarly, in optical systems, the magnitude of the read offset is limited by the width of the light sensitive portion of the read detector. When the read offset 10 is made larger, a part of the read width is sensing a signal outside the possible area for data to be written. The effective width in which the write transducer deposits magnetic field transitions is called the write width of the track 16. Sensing signals outside of the write width 16 is called an offtrack read. When enough of the read width is outside the write width, an error in reading data from the media will occur. The ratio of the read width which senses a signal outside the write width to the portion which senses a signal within the write width is called the noise to signal ratio. When the noise to signal ratio gets larger, the number of read errors increases.

Figure 2:
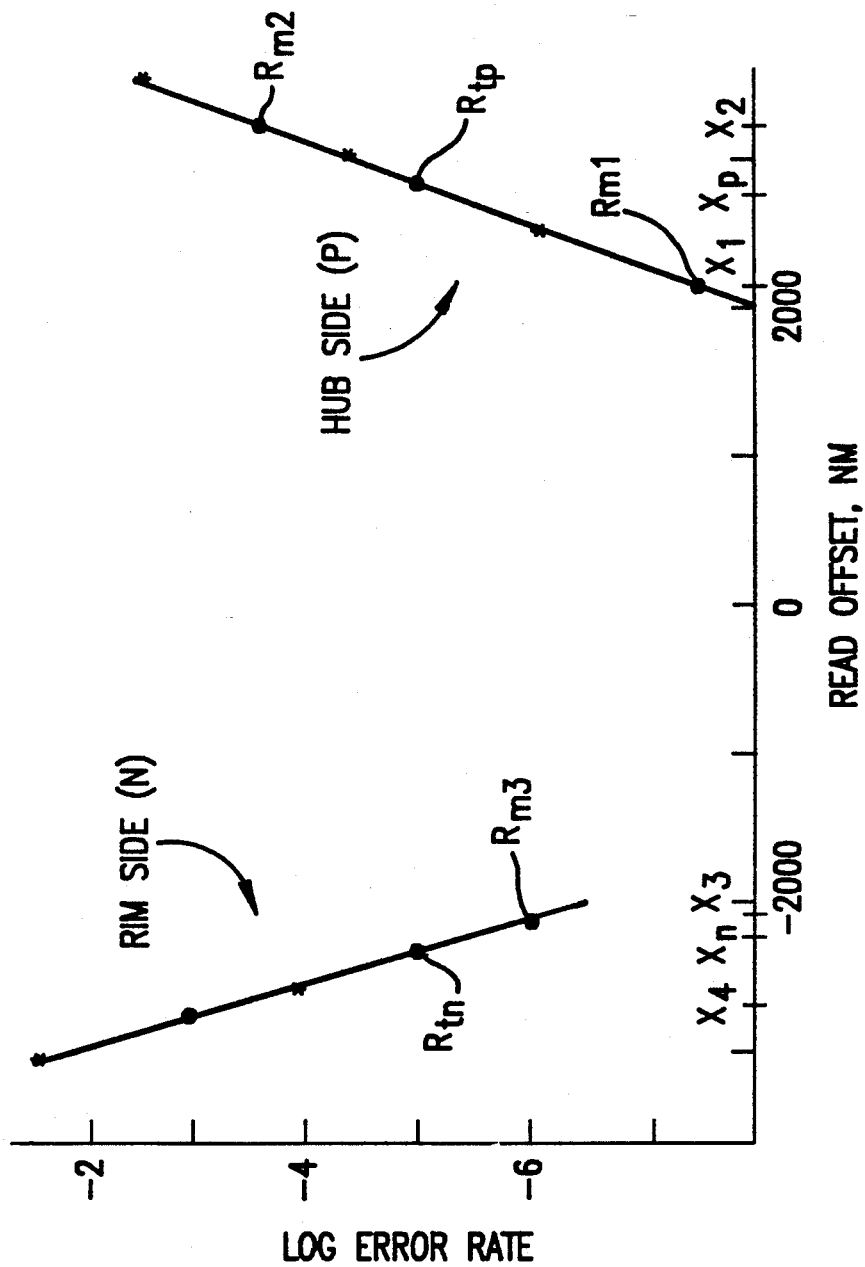
FIG. 2 illustrates the error rate of a rotating storage media as a function of the read offset associated with the detector in the present invention.

The present invention detects the number of read errors as a function of the read offset. It then generates a read offset value which is the fine radial position compensation necessary for the detector 12. The fine radial position compensation of the detector 12 is the difference between where the position of the arm 9 is as determined by the coarse positioning system, and the position of the arm 9 when reading the data. This compensation allows the detector to perform optimally with the lowest error rate. The generation of a read offset value is possible because the number of read errors in a drive system is a well behaved function of the position of the detector. FIG. 2 illustrates an example of one such relationship of the error rate as a function of the read offset 10. In particular, the log of the error rate is a function of the read offset in this type of drive. The form of the function may be linear, as here, or some other empirically determined form depending on the type, size, and shape of the detector and disk used.

The target error rate is denoted by Rtp (p side) and Rtn (n side) in FIG. 2. Rtp and Rtn correspond to the read offsets, Xp and Xn respectively, which result in those target error rates. The magnitude of the target error rate in a storage system is chosen differently depending on the application in which the drive is to be used. For example, when the target error rate is very low, increased time must be spent measuring the error rate to determine the magnitude of the error rate. This results in degraded overall performance of the drive system. In contrast, if the error rate is somewhat higher, less time is spent measuring for that error rate, and so the performance of the system is enhanced. The overall time spent measuring for the error rate and its effect on the drive system performance determines the target error rate chosen.

Figure 3:
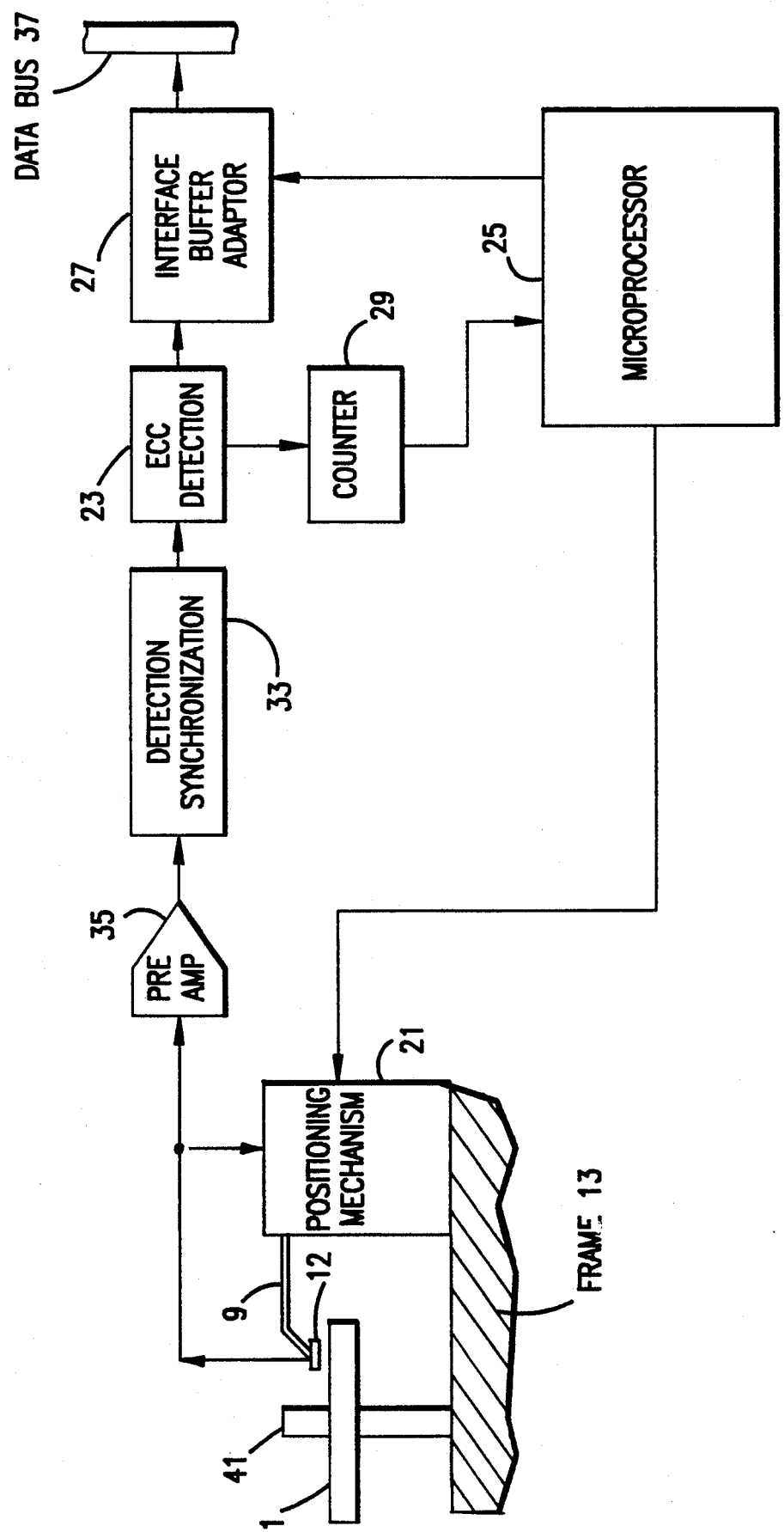
FIG. 3 illustrates a block diagram of a sector servo implementation of the detector position compensation system of the present invention.

FIG. 3 illustrates a block diagram of a first embodiment of the present invention implemented in a sector servo type drive. Data is read from the recording media 1 by the detector element 12. The position of the detector element 12 with respect to the device frame 13 is physically controlled by the positioning means 21 through mechanical arm 9. Mechanical arm 9 is attached to a dual element head which contains a first transducer which is the detector 12, and a second transducer which is the write transducer. The microprocessor 25 instructs the positioning mechanism 21 to position the detector 12 at a particular radial distance from the hub of the rotating spindle 41. The positioning mechanism 21 identifies the rough radial position of the detector 12 by sensing patterns embedded in the data tracks through the detector 12. The detector 12 also senses signal from the active storage space on the recording media 1 and sends them to a preamp 35 for initial amplification. The data content is then extracted from the amplified signal by the data detection and synchronization circuit 33.

Data is read as a string of ones and zeros. The string of ones and zeros contains a self clocking code. The self clocking code was written with the data onto the disk media when the data was stored. The data detection / synchronization circuit 33 separates the clocking code from the data. The clocking code is then used by the detection / synchronization circuit 33 to determine the beginning of the data stream and separate the string of ones and zeros into bytes and blocks of data (a block of data is a plurality of bytes of data). Blocks of data, from the data detection / synchronization circuit 33, are then passed through the Error Correction Code (ECC) detector circuit 23. When a block has an error, the counter 29 is incremented by one. In normal read mode, the data is channeled through the interface buffer adaptor 27 to the data bus 37 on instructions from the microprocessor 25.

The ECC circuitry determines if there is an error by reading the data sent to it in blocks. When the data was initially written, a mathematical operation was performed on a block of data and the result of the operation written with the block. The ECC circuitry segregates blocks of data, then performs the mathematical operation on the blocks of data. If the result of the operation is the same as the result stored with the block, then there has been no error. If the result calculated after reading the data from the media is different than that stored, then there is an error. This error can be corrected by using the mathematical operation to recalculate the inputs that were required to give the result stored. These inputs are compared to the data in the block and the bits corrected. A more detailed explanation of ECC circuitry as used in this invention is contained in U.S. Pat. No. 4,706,250 by Arvind M. Patel of San Jose, Calif., assigned to International Business Machines Corporation, which is hereby incorporated by reference into this specification.

The microprocessor 25 stores Rtp and Rtn (target error rates) chosen for the speed of the storage system, typically Rtp=Rtn. Xtp(t0) and Xtn(t0) are the offsets of the detector 12 which correspond to the target error rates and are obtained by writing data to active storage space on the recording media 1 and then reading that data back. The data is initially written and read back with the positioning means 21 having a random but known read offset. The ECC detection / correction means 23 senses errors in the blocks of data on the recording media 1 and the counter 29 maintains a record of the number of errors. The ECC detection / correction means 23 does not correct the data and microprocessor 25 does not send it to the data bus 37 during the measurement of Xtp(t0) and Xtn(t0). The microprocessor 25 calculates the number of errors per number of good bits or sectors which is defined as the measured error rate Rmp(t0) or Rmn(t0).

The set of written data is read back at several read offsets to produce a measured error rate for each read offset. This process is repeated on each side of the track. If the first measured error rate is higher than Rtp or Rtn, then the read offset is reduced before the next measurement is made. If the first error rate is less than Rtp or Rtn, then the read offset is increased before the next measurement is made. This process is repeated until the error rate sensed on each side of the track is substantially equal to Rtp or Rtn. The position at which the target error rate is reached becomes Xtp(t0) and Xtn(t0). When Xtp(t0) and Xtn(t0) have been determined, the microprocessor 25 mathematically determines the radial position of the detector 12 which will center the detector over the written track. This position is halfway between Xtp(t0) and Xtn(t0). The microprocessor 25 instructs the positioning mechanism 21 to adjust the position of the detector by the read offset of (Xtp(t0)+Xtn(t0))/2, where Xtn (t0) is a negative number. This could also be expressed as (abs(Xtp(t0))−abs(Xtn(t)))/2, where abs(X) denotes the absolute value of X. The positioning mechanism 21 then maintains this relationship between the position of the written track and the detector 12 when data is read by adjusting the detector 12 position by this read offset.

The determination of Xtp and Xtn is done without the use of extra detection circuitry. No special relationship between the sensed signal from the recording media and the position of the read detector is contained in the written data, and therefore, no extra circuitry is necessary to detect such a relationship from the data. Instead, the position of the read detector is determined by the known relationship between the error rate of the stored data and the various read offsets. Determination of the error rate requires the read, write, compare, and control functions for digital data which would already exist in a digital storage system. Specifically, the compare and control functions exist in the microprocessor 25. A commercial microprocessor having such functions and suitable for use in this invention would be the 8051 microprocessor from the Intel Corporation or one of many equivalents. Additionally, the present invention's use of active storage space on the recording media is only temporary. As a result, there is no need to permanently reserve space otherwise useful for storing data. In fact, normally written data could be used for determining the compensation.

Microprocessor 25 permanently stores the values of Xtp(t0) and Xtn(t0). The misalignment of the detector to the write transducer is the difference between the magnitudes of Xtp(t0) and Xtn(t0). When abs(Xtn(t0))=abs(Xtp(t0)) the misalignment is zero, and when the values are not equal the misalignment is (Xtn(t0)+Xtp(t0))/2. The sign of the misalignment determines the offset direction. This is the read offset which centers the detector at time (t0). The microprocessor also periodically re-determines Xtp and Xtn while the storage system is activated. Xtp and Xtn are determined for other times (t1, t2, t3, etc.) and conditions of the drive operation. Each time Xtp and Xtn are determined, a new read offset for the target error rate is determined, and the microprocessor instructs the detector compensation means 21 to place the detector 12 half way between the new Xtp and Xtn. The microprocessor 25 then determines a new misregistration and also compares the new (i.e., t1, t2, t3, etc.) Xtp and Xtn to the old (i.e., t0) Xtp and Xtn. The microprocessor 25 then correlates the read offsets to the temperature, speed of the rotating media, misregistration, or other physical parameters. Therefore, the microprocessor can check whether the new read offset or misregistration is consistent with previous read offsets under similar conditions.

Figure 4:
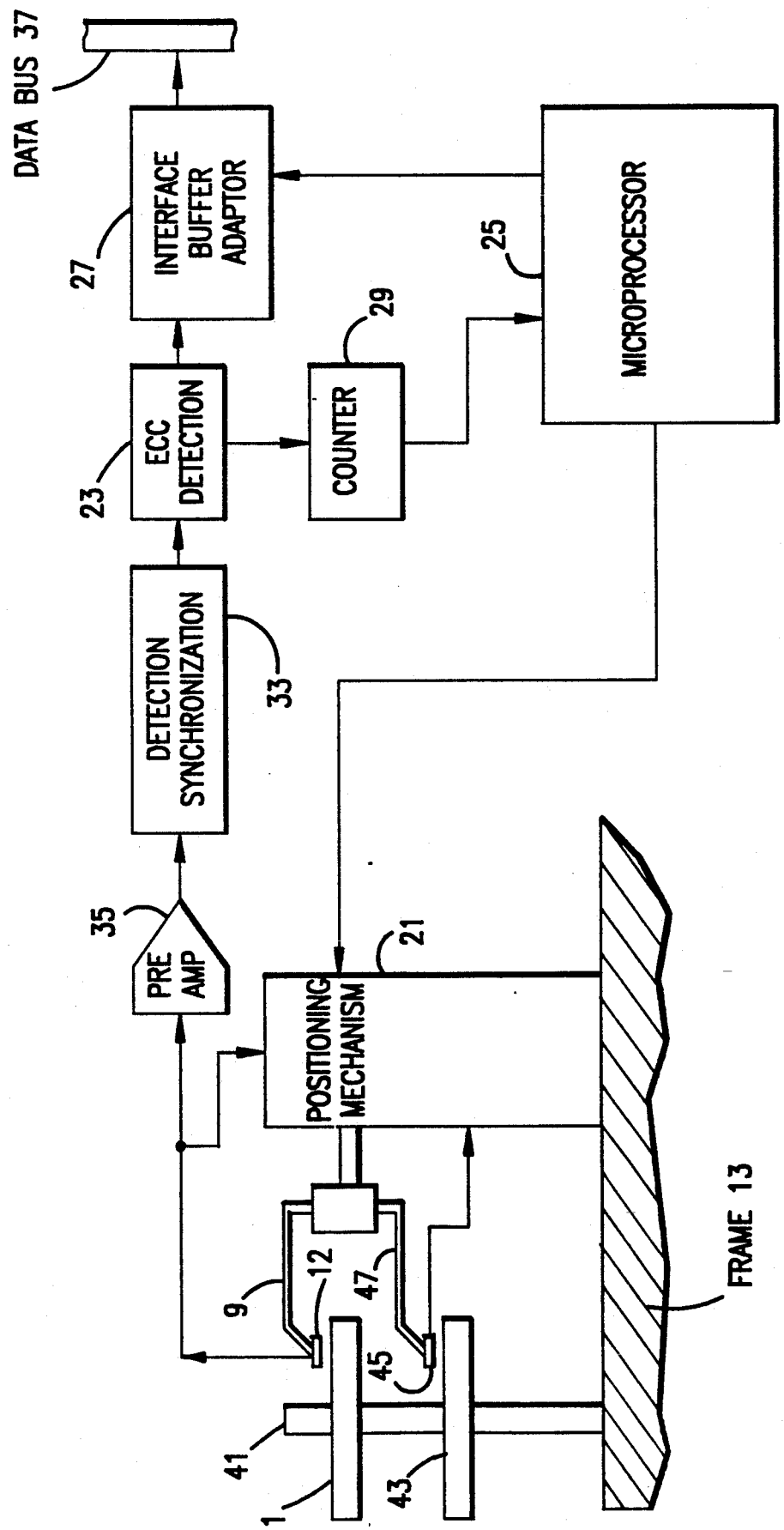
FIG. 4 illustrates a block diagram of a dedicated servo implementation of the detector position compensation system of the present invention.

The first embodiment of the present invention is illustrated as implemented in a dedicated servo type drive system in FIG. 4. In this type of drive system, the positioning mechanism 21 links two mechanical arms. The mechanical arm 9 positions the dual element head, and hence the detector 12. The mechanical arm 47 positions the position sensor 45. Position sensor 45 is a transducer similar in design and fabrication to the detector 12. The detector 12 and the position sensor 45 sense signals on two different disks, recording surface 1 and reference surface 43. Both media rotate about the same spindle 41. Position mechanism 21 maintains an adjustable relationship between the radial position of the mechanical arm 9 and arm 47. Reference surface 43 contains sensing patterns which are sensed by position sensor 45 and sent to the positioning mechanism 21. These sensing patterns, as interpreted by the positioning mechanism 21, determine where the position sensor is on the reference surface 43. The position of the detector 12 is then known with respect to the recording surface 1 because a stable relationship is maintained between the detector 12 and the position sensor 45 through the mechanical arms 9 and 47, respectively.

The stable relationship between the detector 12 and position sensor 45 is compensated by the positioning mechanism 21 in response to commands from the microprocessor 25. The microprocessor 25 determines an Xtp(t0) and an Xtn(t0) for the target error rate by writing data to the recording surface 1 and reading it back through detector 12 at multiple read offsets. The signal read back goes through the preamp 35, the ECC circuitry 23 and the counter 29, just as it did in the sector servo implementation. The error in the linkage between the two mechanical arms is then eliminated by adjusting the arm 9 with respect to the arm 47 so that the detector 12 is half way between Xtp(t0) and Xtn(t0), giving the detector a read offset of (Xtp(t0)+Xtn(t0))/2.

A second embodiment of the present invention efficiently determines Xtp(t1) and Xtn(t1) when Xtp(t0) and Xtn(t0) are known. The second embodiment can be implemented on a dedicated servo, sector servo, or other type of drive system in a similar manner to the first embodiment as illustrated above. The particular function of error rate to read offset depicted in FIG. 2 for a type or design of drive is determined empirically. The form of the function will depend on the design of the drive and therefore does not require testing on each drive. Specifically, a particular type of drive is tested to determine how many read errors occur as a function of the distance from the center of the write width on the track to the maximum allowed read offset. The magnetic media drive which exhibits the characteristic function of log error rate being a linear function of the read offset, as shown in FIG. 2, has the following characteristics: a 3.5 inch rotating disk for storage media having a 10 micron track width and being made of sputtered thin film Cobalt-Chromium alloy, the transducers are magnetoresistive stripes having effective read widths of 5.5 microns, and write widths of 7.5 microns, the detection circuitry is of a conventional peak-detect type, and a typical misalignment between transducers is on the order of 0.25 microns.

Once the form of the function for a particular type of drive is known, the form of that function is stored in the microprocessor 25 of the storage system. The unknown parameters of the function which determine the position compensation of the detector for each specific drive are obtained by determining Xtp(t0) and Xtn(t0) as in the first embodiment. The positioning mechanism 21 adjusts the detector 12 position by the read offset (determined at (t0)) in response to the commands of the microprocessor 25. The microprocessor 25 then follows the process shown in FIGS. 5 and 6 to determine Xmp(t1) and Xmn(t1).

Figure 5:
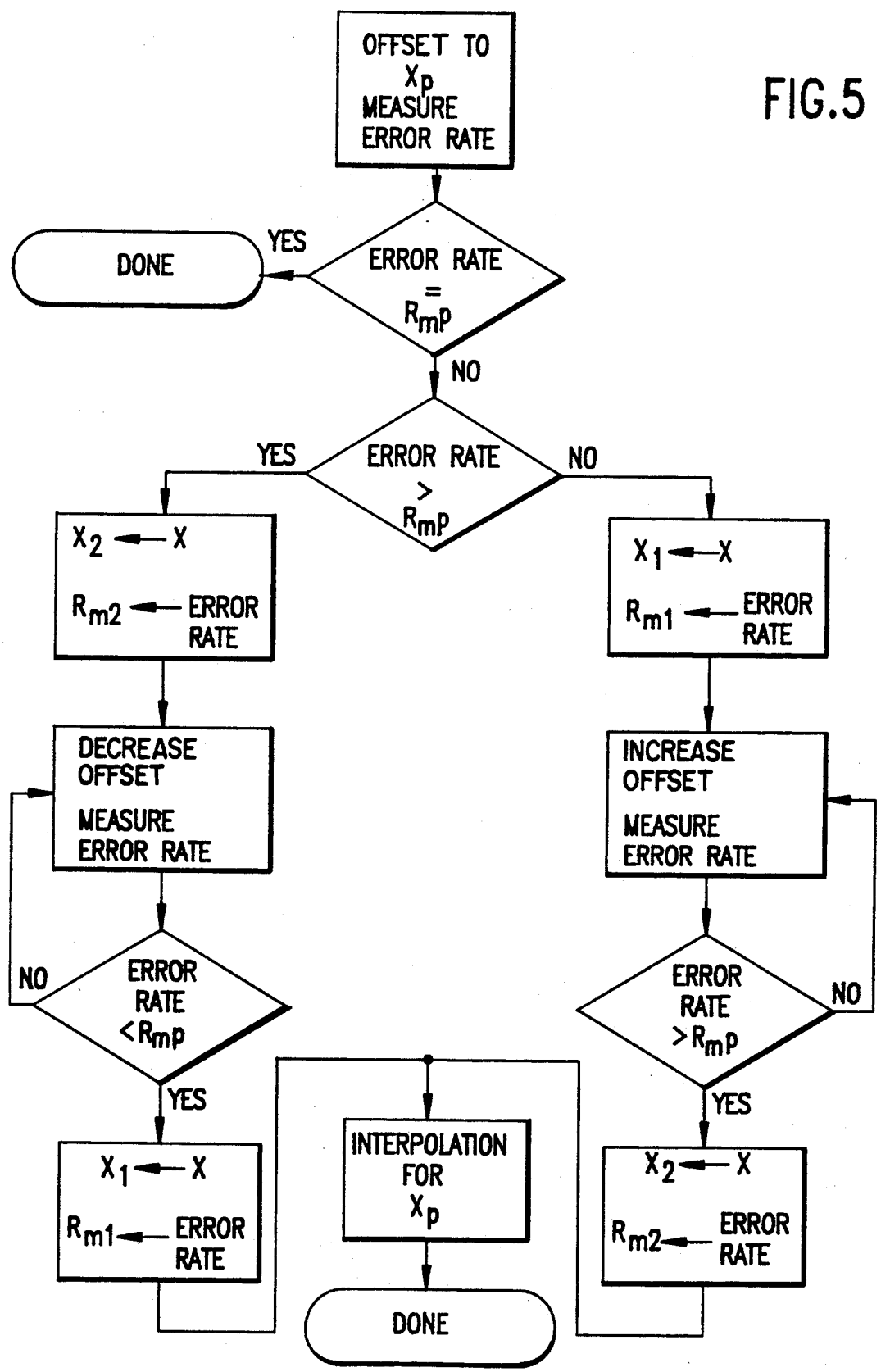
FIG. 5 illustrates the interpolation process for the P side of the data track in the present invention.

FIG. 5 illustrates the process by which this is accomplished for side p of the track. The position compensation system adjusts the position of the detector to Xp=Xtp(t0) and determines an error rate at that point Rm2. The error rate at Xp was previously measured on the drive to be Rtp. When Rtp substantially equals Rm2, then there is no compensation necessary to the detector position. When Rm2 is greater than Rtp, then Xp is not the same distance from the center of the track as it was when originally measured and is, at this point, unknown. It is unknown because a thermal or mechanical error has been introduced into the mechanical system. However, because Rm2 is larger than Rtp, and the measurement being performed is on the p side of the track, X2 (the current position of the detector corresponding to Rm2) is equal to Xp +dxp. Additionally, the compensation system measures a second set of data, in which the error rate is lower than Rtp. Here the drive mechanism compensates the position of the detector a known amount from X2, until Rm1 is less than Rtp, and denotes this position as X1. Although the absolute position of Xp(t1) is not yet known, X2-X1 is known. The measured values of Rm1, X2-X1, Rm2, and Rtp, allow a determination of dxp through linear interpolation and hence the relative positions of Xp(t1), X2, and X1. When the form of the function relating the detector position to the log of the error rate is linear, as shown in FIG. 2, the interpolation gives: dxp=(log(Rm2)-−log(Rtp))×(X2-X1) / (log(Rm2)-log(Rm1)) Xp=X1+(X2−X1)−dxp Xp is expressed in terms of X1 and (X2-X1) because X1 was the last position of the detector and it can be moved, if desired, by the known quantities (X2-X1) and dxp to Xp. The interpolation method will depend on the characteristic function of the drive system. However, interpolation between error rates, higher and lower than the target error rate on a known characteristic function, determine Xtp(t0) much quicker, with high accuracy, and with fewer measurements than the comparison of repeated measurements method used in the first embodiment.

Figure 6:
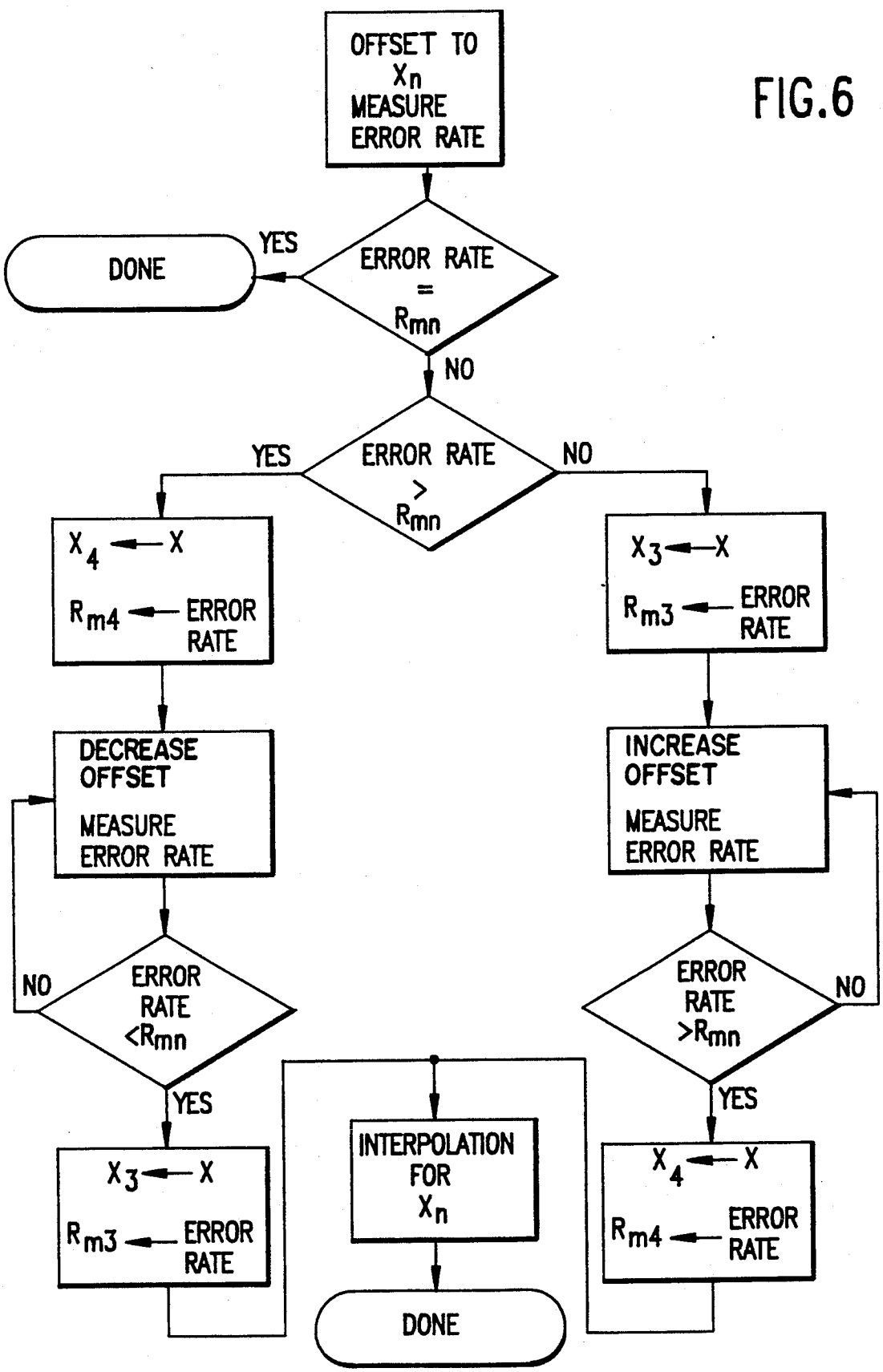
FIG. 6 illustrates the interpolation process for the N side of the data track in the present invention.

FIG. 6 illustrates that this process is repeated for the n side of the track. The detector position is offset to Xn and the error rate measured. If the current measured error rate is equal to the previously measured error on the n side of the track, Rtn, then no compensation is required. If the current error rate is higher than Rtn, it is labeled Rm4, and Xmn−dxn=X4. The position of the detector is adjusted by (X4−X3), and a new error rate, Rm3, is measured which is lower than Rtn. Again, as on the p side, dxn can be calculated as: dxn=(log(Rm4)−log(Rtn))×(X4-X3) / (log(Rm4)−log(Rm3)) Xn=X3−(X4−X3)+dxn. Again, as in Xp, Xn is expressed in terms of X3 and (X4−X3) because X3 was the last position of the detector 12 and it can be moved, if desired, by the known quantities (X4−X3) and dxn to Xn. When Xp and Xn are known, the detector 12 is placed midway between Xp and Xn.

Where dxn is equal to dxp, the detector position has no misalignment from the center of the write width of the track. When dxn is not equal to dxp then the detector 12 is misaligned either to the positive or negative side of the track with respect to the center of the write width of the track. This misalignment is also correctable from the above data. The misalignment is equal to (Xp − Xn) / 2. Therefore, if Xp is greater than Xn and the misalignment is positive, the detector is moved in the negative direction by half the distance between Xp and Xn. Similarly, if the misalignment is negative, the detector is moved in the positive direction by half the distance between Xp and Xn.

The accuracy of the read detector adjustment depends on the granularity of the data being read. Error rate can be expressed as the number of bad sectors, bytes, or bits, out of the number of read sectors, bytes, or bits respectively. Employing conventional ECC circuitry as described here, the granularity is one block. This is a variable quantity depending on the drive usage. One block is often 512 bytes which presently allows 40 to 80 blocks per track on a 3.5 inch disk. Blocks may comprise an entire sector or a portion of a sector. Grouping more bits in the definition of the error rate makes the measurement easier because there are less errors to tabulate. However, grouping more bits in the definition of error rate makes the granularity larger. Therefore, the resolution in the adjustment decreases because the error in interpolation gets larger with the larger granularity in the definition of the end points Rm1, Rm2, Rm3, and Rm4. Using 3.5 inch magnetic disk media having 20 data sectors per track (less sectors than typically used), a repeatability of detector position of +/−10 microinches is achieved. The measurement cycle consisted of 5 revolutions, or 100 sectors of data. The variation of error rate may also affect the accuracy. The measurement time was approximately 0.1 seconds. The time between updating the read offset while the drive system is in operation depends on the thermal expansion rates of the components in a drive system. In a dedicated servo type drive, the drive requires an update of the read offset approximately every five minutes for the first twenty minutes after powering up and every twenty minutes thereafter.

A third embodiment of the present invention retains good throughput capability while calculating a new position compensation from sector data. The third embodiment is implemented on a dedicated servo or other type of drive system in a similar manner to the first and second embodiments of the present invention illustrated above. In the third embodiment, when calculating compensation, an error is detected when a sector is read and the error correction code syndrome (generated from the error correction code circuitry and software) indicates that an error exists. The error correction code syndrome is known immediately after the sector is read. If the syndrome has either a zero or clear state, then there are no errors in the sector. If the syndrome has a non-zero state, an error is detected for the sector. The error correction code software is not used to correct the sector error because this takes much longer than just detecting the existence of the error and counting it. The third embodiment utilizes error rates close to the unity sector failure rate to determine the locations or offsets for the edges of the data track which are subsequently used to calculate the position offset compensation. A unity failure rate denotes when all the sectors read on a track have errors in them. For example, if 48 sectors on a track are read and all 48 sectors are in error, then the offset at which the track is read, is the offset for the unity failure rate.

The third embodiment performs position offset compensation for a head when any of three conditions are met. They are: (1) after a pre-set number ($Y_1$) of normally read sectors contain an error, (2) a pre-set time has elapsed, or (3) after a pre-set number of sectors have been read. The head is repositioned after any one of these three events according to two single direction edge searches. An edge is the position offset at which the number of errors is approximately equal to a pre-set threshold ($Y_2$). That is, an edge is the position where the errors in error correction code syndromes have been invoked on $Y_2$ sectors out of the total number on the track. The position offset dictated by the threshold $Y_2$ is allowed to change for different recording surfaces or at different radii on a recording surface. The offset values are saved for use in the next update of the head position compensation. Typically, the error rate target $Y_2$ remains constant.

In performing a head position compensation, initially a single direction edge search provides an offset (towards either the rim or hub side of the recording surface) which is saved for use in future calculations of the head position which is expected to produce more than $Y_2$ errors. When more than $Y_2$ errors are detected at this offset, the offset is gradually decreased until less than (or equal to or within a prescribed range of) $Y_2$ errors are detected. If less than $Y_2$ errors are initially detected, the offset is gradually increased until more than (or equal to or within a prescribed range of) $Y_2$ errors are detected. The edge search determines the position offset of one side of the track (toward the hub or rim) where the number of errors approximately equals $Y_2$. The edge search moves from the saved position towards the edge in a single direction because the error rate is constantly increasing or decreasing with respect to the offset in the area around the saved head position. Subsequent updates of the edge position utilize the last saved edge position as a starting offset for determining the subsequent edge positions.

This edge search is completed on the positive side track edge and on the negative side track edge. Subsequent updates utilize the saved offset for the track edge to save update time. The compensation calculated from the track edge head positions, place the head on the track based on previously set criteria. The criteria here may be as simple as the average of the positive track side offset and the negative track side offset. The criteria may be more elaborate and may introduce the compensation required to account for the write element to read element offset.

The conditions which initiate the repositioning of the head in the third embodiment are typically that 1) the errors detected exceed 10 ($Y_1 = 10$) since the last repositioning, (2) the time between repositioning is 3 minutes, and (3) that the total number of sectors read since the last repositioning is 2404. The dual single edge searches are completed in approximately 1.1 seconds which is approximately 99.37% throughput for 3 minute time intervals. $Y_2$ may be varied for each drive and the design specification goals for the drive.

A more elaborate criteria for calculating compensation involves tabulating sector failure rate or error rate data for sections of the track. This would be performed to correct for repeatable run out conditions. Repeatable run out is defined as when a recorded track no longer appears concentric to the center for a head which is trying to read the track. The offset compensation for the sections would be calculated exactly as described for whole tracks in embodiment three.

Additionally, offset compensations using the write element of a dual element head may be performed providing a compensation value which is preset or predetermined, as in embodiment one. Further, any of the embodiments described for this invention may be used as a step in a data recovery procedure which is invoked after a data read is performed and an error is detected. Recompensation of the head offset can be used to optimize the read detector position with respect to the track and thus greatly improve the probability that the data can be read correctly.

While this invention has been particularly described and illustrated with reference to several preferred embodiments thereof, it will be understood by those skilled in the art that changes in the above description or illustrations may be made with respect to form or detail without departing from the spirit and scope of the invention.

I claim:

1. A method for placing a data detector adjacent stored data in a data storage system, comprising:
    counting a number of errors in data read from a data track in said storage media by said data detector and determining a measured error rate from said counted errors;
    adjusting the position of said data detector toward one side of said data track;
    rereading said data, recounting said errors, redetermining said measured error rate, and readjusting said data detector position to determine a first relative position, Xt1, with respect to said data track, where said measured error rate is substantially equal to a first predetermined error rate, Rta; and
    adjusting said data detector position according to said first relative position.

2. A method for placing a data detector adjacent stored data in a data storage system, as in claim 1, further comprising:
    adjusting the position of said data detector toward a second side of said data track;
    rereading said data, recounting said errors, redetermining said measured error rate, and readjusting said data detector position to determine a second relative position, Xt2, with respect to said data track, where said measured error rate is substantially equal to a second predetermined error rate, Rtb; and
    adjusting said data detector position according to said first and second relative position.

3. A method for placing a data detector adjacent stored data in a data storage system, as in claim 1, further comprising:
    periodically redetermining said first relative position, Xt1; and
    readjusting said data detector position according to said recalculated first relative position.

4. A method for placing a data detector adjacent stored data in a data storage system, as in claim 2, wherein:
    Rta is substantially equal to Rtb.

5. A method for placing a data detector adjacent stored data in a data storage system, as in claim 2, wherein:
    said adjustment of said data detector position corresponds to:

$(abs(Xt1) - abs(Xt2))/2$.

6. A method for placing a data detector adjacent stored data in a data storage system, as in claim 2, further comprising:
    periodically redetermining Xt1 and Xt2; and
    readjusting said data detector position according to said redetermined Xt1 and Xt2.

7. A method for placing a data detector adjacent stored data in a data storage system, comprising:
    storing a first relative position, $X_a(t0)$, of said detector with respect to a data track in said storage system, where a measured error rate is substantially equal to a first predetermined error rate, Rta:
    determining a first test position, X1, by adjusting said data detector position toward one side of said data track, reading said stored data in said data track, counting errors from said read data, and determining a measured error rate from said counted errors where said measured error rate, Rm1, is lower than said first predetermined error rate;
    determining a second test position, X2, by readjusting said data detector position, rereading said stored data in said data track, recounting errors from said read data, and determining a measured error rate from said recounted errors where said measured error rate, Rm2, is higher than said first predetermined error rate;
    interpolating between said first and second test positions to determine a current first relative position; and
    adjusting said data detector position from $X_a(t0)$ according to said current first relative position.

8. A method for placing a data detector adjacent stored data in a data storage system, as in claim 7, wherein:
    said interpolation results in said current first relative position being substantially equal to:

$X2 + ((X1-X2) \times dxa)$; wherein:
    $dxa = (\log(Rm1) - \log(Rta)) \times (X1-X2)/(\log(Rm1) - \log(Rm2))$.

9. A method for placing a data detector adjacent stored data in a data storage system, as in claim 7, further comprising:
    periodically redetermining said first and second test positions;
    interpolating between said redetermined first and second test positions to determine a current first relative position; and adjusting said data detector position according to said current first relative position.

10. A method for placing a data detector adjacent stored data in a data storage system, as in claim 7, further comprising:

storing a second relative position, $X_b(t0)$, of said detector with respect to a data track in said storage system, where a measured error rate is substantially equal to a second predetermined error rate, Rtb;

determining a third test position, X3, by adjusting said data detector position toward a second side of said data track, reading said stored data in said data track, counting errors from said read data, and determining a measured error rate from said counted errors where said measured error rate, Rm3, is lower than said second predetermined error rate;

determining a fourth test position, X4, by readjusting said data detector position, rereading said stored data in said data track, recounting errors from said read data, and determining a measured error rate from said recounted errors where said measured error rate, Rm4, is higher than said second predetermined error rate;

interpolating between said third and fourth test positions to determine a current second relative position; and adjusting said data detector position from $X_b(t0)$ according to said current second relative position.

11. A method for placing a data detector adjacent stored data in a data storage system, as in claim 9, wherein:

said interpolation results in said current first relative position being substantially equal to:

$$X2+((X1-X2)\times dxa); \text{ wherein:}$$
$$dxa=(\log(Rm1)-\log(Rta))\times(X1-X2)/(\log(Rm1)-\log(Rm2)).$$

12. A method for placing a data detector adjacent stored data in a data storage system, as in claim 10, wherein:

said interpolation results in said current first relative position being substantially equal to:

$$X2+((X1-X2)\times dxa); \text{ wherein:}$$
$$dxa=(\log(Rm1)-\log(Rta))\times(X1-X2)/(\log(Rm1)-\log(Rm2));$$

said interpolation results in said current second relative position being substantially equal to:

$$X4+((X3-X4)\times dxb); \text{ wherein:}$$
$$dxb=(\log(Rm3)-\log(Rtb))\times(X3-X4)/(\log(Rm3)-\log(Rm4)),$$

and;

said calculation of said second relative position is:

$$(abs(Xt1)-abs(Xt2))/2.$$

13. A method for placing a data detector adjacent stored data in a data storage system, as in claim 11, further comprising:

periodically redetermining said first and second test positions;

interpolating between said redetermined test positions to determine a current first relative position; and readjusting said data detector position according to said current first relative position.

14. A method for placing a data detector adjacent stored data in a data storage system, as in claim 12, further comprising:

periodically redetermining said first, second, third, and fourth test positions;

interpolating between said test positions to determine a current first relative position and a current second relative position; and readjusting said data detector position according to said current first and second relative positions.

15. A data detection system, comprising:

detector positioning means coupled to a data detector and connected to data detection circuitry, said detector positioning means places said data detector adjacent a data storage media and adjusts said data detector position with respect to said storage media in response to commands from a microprocessor;

said data detector senses signals on said storage media and transmits those signals to said data detection circuitry which extracts data from said signals;

error correction circuitry connected between said data detector circuitry and a counter which receives data from said data detection circuitry and detects errors in said data, said error correction circuitry transmits a signal to said counter for each of said errors;

said counter, connected between said error correction circuitry, and said microprocessor, counts said errors and transmits a counter result to said microprocessor;

said microprocessor, connected to said counter and said detector positioning means, determines a measured error rate based on said counter result; and said microprocessor commands said detector positioning means to adjust said data detector position with respect to said data storage media in response to said measured error rate to maintain a first predetermined error rate.

16. A data detection system, as in claim 15, wherein:

said detector positioning means initially places said detector adjacent a data track on said storage media containing stored data;

said microprocessor compares said measured error rate to said first predetermined error rate and commands said detector positioning means to adjust said detector position based on said comparison when said measured error rate is not substantially equal to said first predetermined error rate; and said microprocessor periodically redetermines a current measured error rate and commands said detector positioning means to readjust said detector position after said adjustment based on said comparison between said measured and first predetermined error rates until said current measured error rate substantially equals said first predetermined error rate.

17. A data detection system, as in claim 15, wherein:

said microprocessor stores a first relative position, $X_a(t0)$, of said data detector with respect to a data track in said storage system, where a measured error rate is substantially equal to a first predetermined error rate, Rta;

said microprocessor commands said detector positioning means to adjust said data detector position to a first test position, X1, where said measured error rate, Rm1, is lower than said first predetermined error rate;

said microprocessor commands said detector positioning means to adjust said data detector position to a second test position, X2, where said measured error rate, Rm2, is higher than said first predetermined error rate;

said microprocessor interpolates between said first and second test positions to determine a current first relative position; and said microprocessor commands said detector positioning means to adjust said data detector according to said current first relative position.

18. A data detection system, as in claim 17, further comprising:
   a single mechanical arm to couple said detector positioning means to said data detector; and
   a write transducer attached to said data detector by said mechanical arm.

19. A data detection system, as in claim 17, further comprising:
   a first mechanical arm to couple said detector positioning means to said data detector;
   a write transducer attached to said data detector by said first mechanical arm;
   a second mechanical arm to couple said detector positioning means to a position sensor, said detector positioning means places said position sensor adjacent a reference media; and
   said detector positioning means links said first mechanical arm to said second mechanical arm wherein said data detector position with respect to said data storage media tracks said position sensor with respect to said reference media.

20. A data detection system, as in claim 17, wherein:
   said microprocessor stores a second relative position, $X_b(t0)$, of said data detector with respect to a data track in said storage system, where a measured error rate is substantially equal to a second predetermined error rate, Rtb;
   said microprocessor commands said detector positioning means to adjust said data detector position to a third test position, X3, where said measured error rate, Rm3, is lower than said second predetermined error rate;
   said microprocessor commands said detector positioning means to adjust said data detector position to a fourth test position, X4, where said measured error rate, Rm4, is higher than said second predetermined error rate;
   said microprocessor interpolates between said third and fourth test positions to determine a current second relative position; and
   said microprocessor commands said detector positioning means to adjust said data detector according to said current first and second relative positions.

21. A data detection system, as in claim 20, further comprising:
   a single mechanical arm to couple said detector positioning means to said data detector; and
   a write transducer attached to said data-detector by said mechanical arm.

22. A data detection system, as in claim 20, further comprising:
   a first mechanical arm to couple said detector positioning means to said data detector;
   a write transducer attached to said data detector by said first mechanical arm;
   a second mechanical arm to couple said detector positioning means to a position sensor, said detector positioning means places said position sensor adjacent a reference media; and
   said detector positioning means links said first mechanical arm to said second mechanical arm wherein said data detector position with respect to said data storage media tracks said position sensor with respect to said reference media.

23. A data detection system, as in claim 21, wherein:
said data detector and said write transducer are selected from the group of magnetic transducers or optical sensors.

24. A data detection system, as in claim 22, wherein:
said data detector and said write transducer are selected from the group of magnetic transducers or optical sensors.

25. A data detection system, as in claim 22, wherein:
said reference media also functions as said storage media.

* * * * *